March 6, 1945. H. W. WOODWARD 2,371,095
DEHYDRATOR
Filed June 24, 1943 4 Sheets-Sheet 2
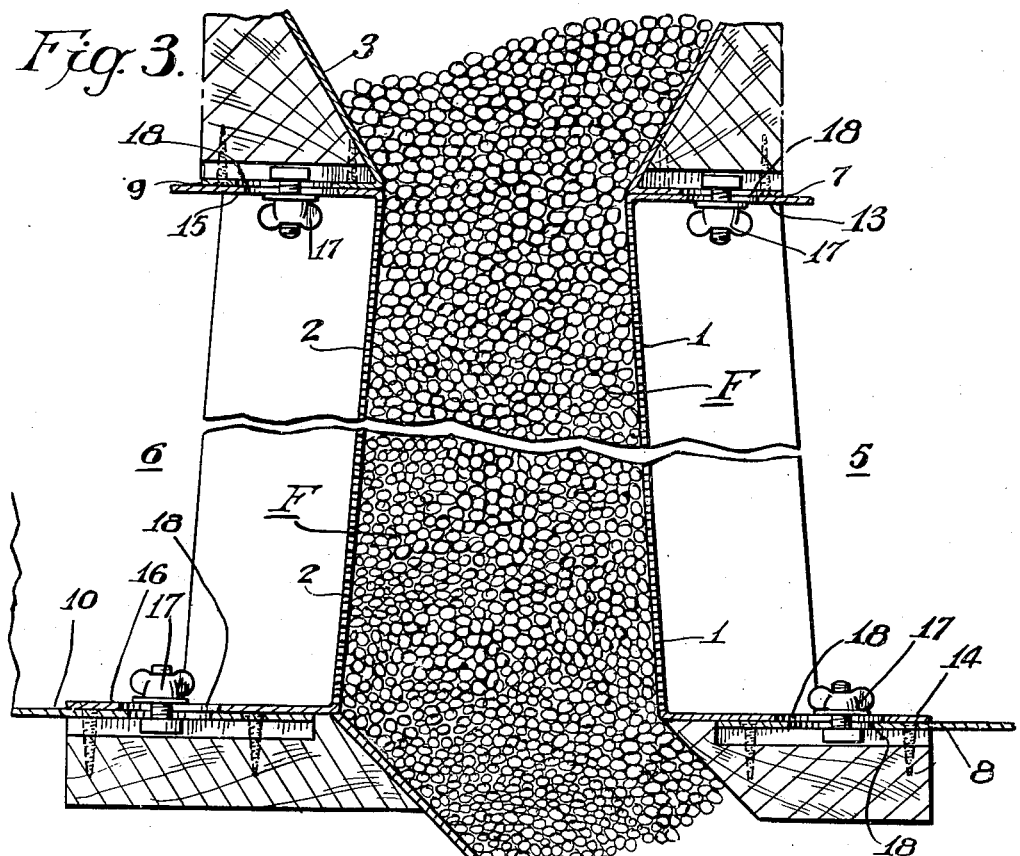
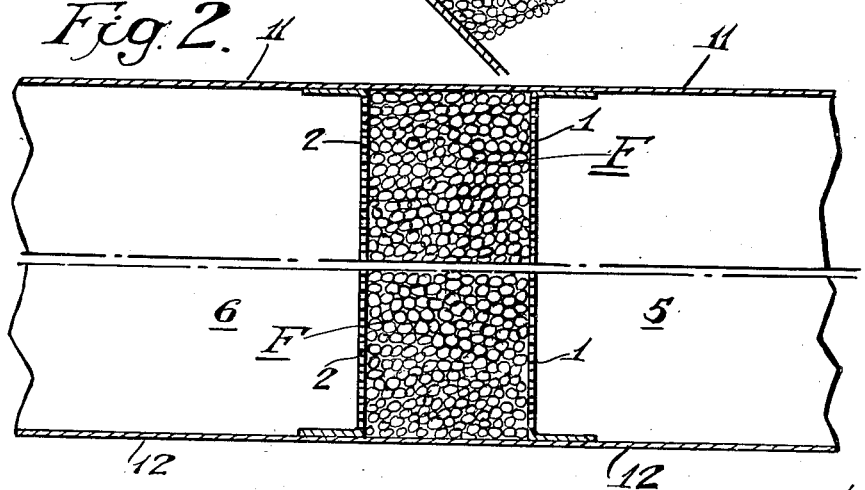
Inventor:—
Hiram Woods Woodward
by his Attorneys
Howson & Howson

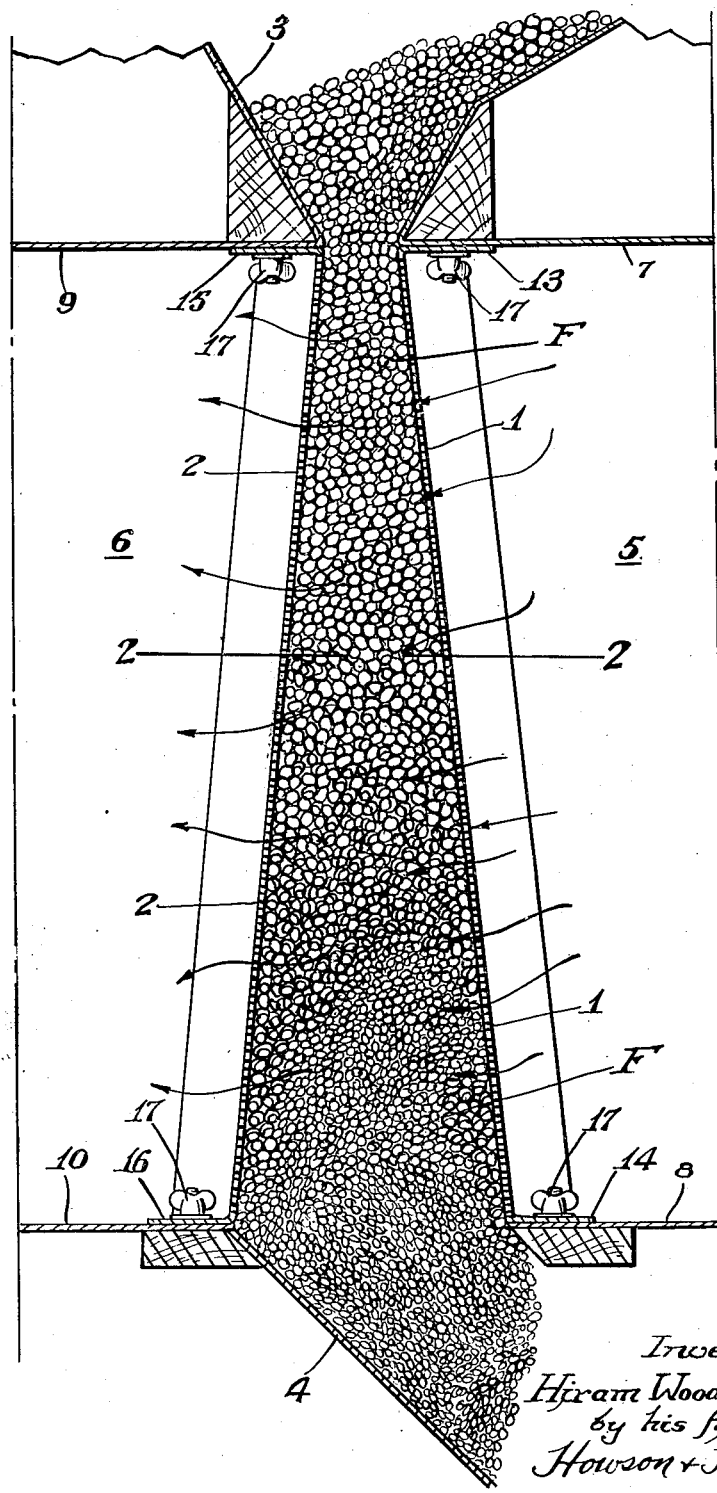

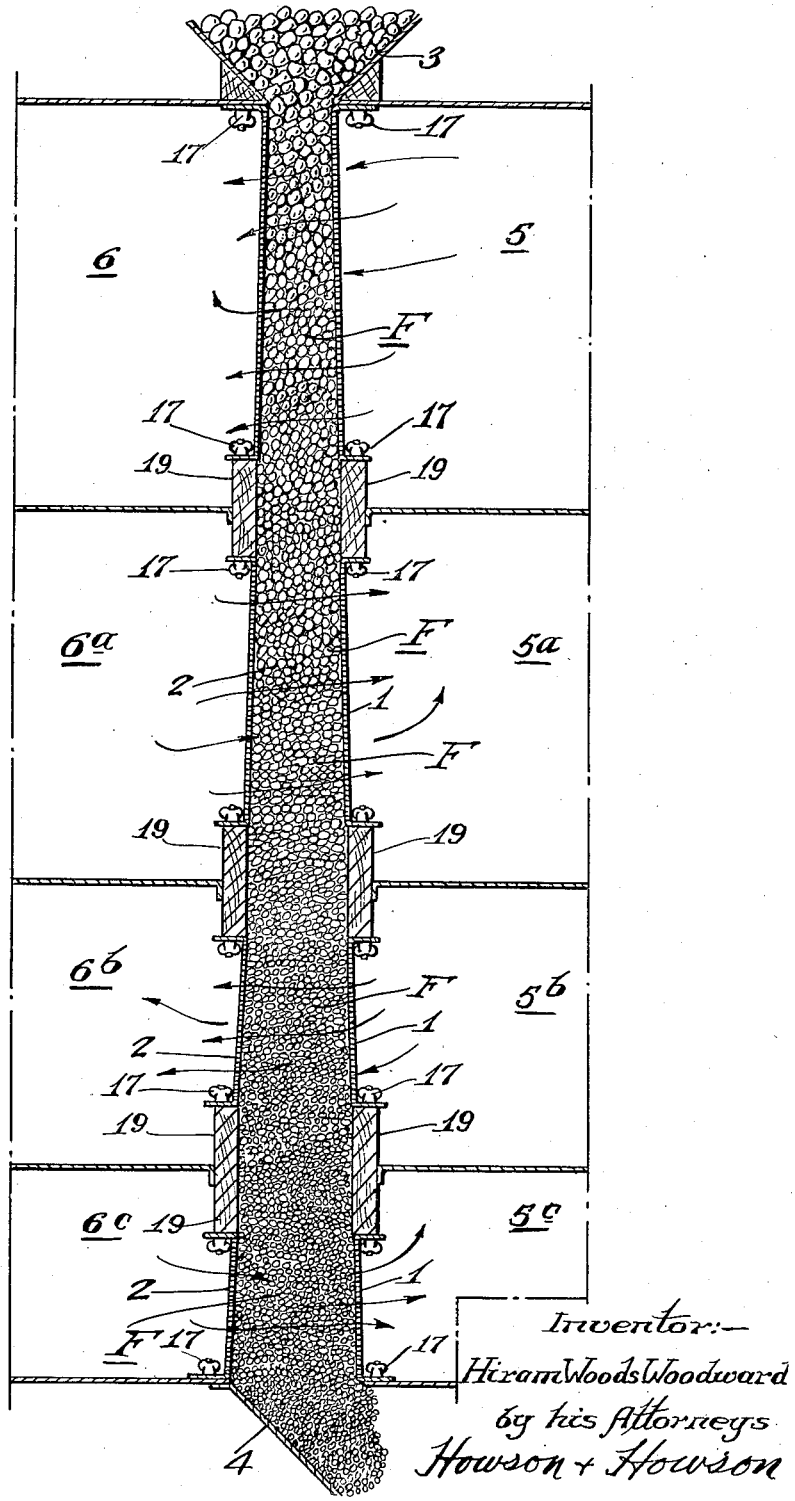

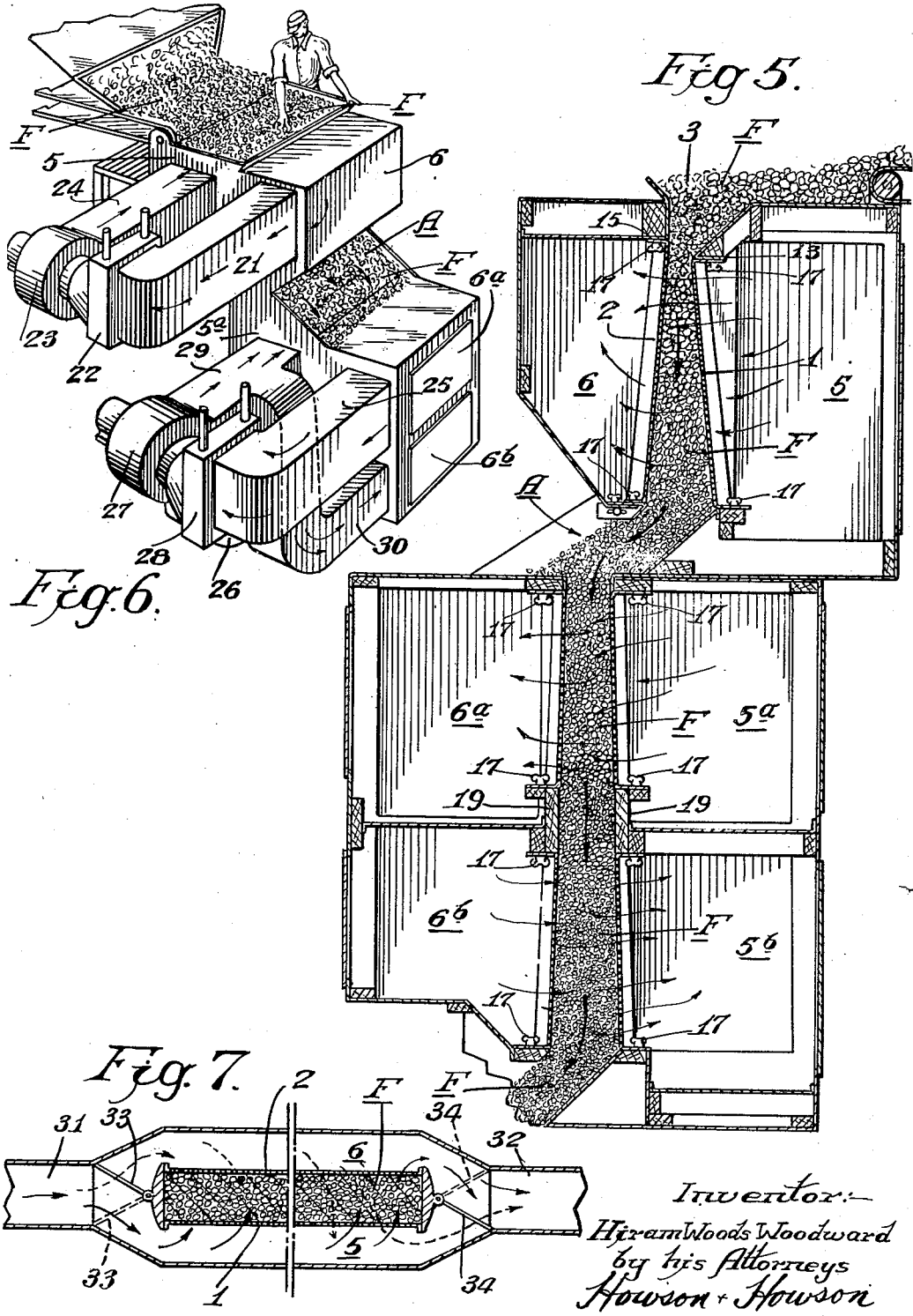

Patented Mar. 6, 1945

2,371,095

UNITED STATES PATENT OFFICE 2,371,095

DEHYDRATOR

Hiram W. Woodward, Baltimore, Md., assignor of one-half to Strasburger & Siegel, Baltimore, Md., a partnership comprising Le Roy V. Strasburger and Maurice Siegel Application June 24, 1943, Serial No. 492,104

2 Claims. (Cl. 34—174)

This invention relates to drying or dehydrating apparatus, and more particularly to apparatus for drying or dehydrating foodstuffs such as, for example, fruit, vegetables, and the like.

Heretofore, numerous attempts have been made to produce adequate and efficient apparatus for dehydrating foods. These attempts, for the most part, have consisted of dehydrators or driers wherein the drying medium is passed over and/or beneath the surface of a quantity of food to be dried which has been placed on screens or solid or perforated trays.

In such dehydrators, in which the drying medium is passed over or beneath the surface of a quantity of food, not only in the majority of cases must the tray load be extremely light, thus materially limiting the capacity of the drier, but passage of the drying medium over or beneath the surface of the food produces an extremely non-uniform drying action because the drying medium does not readily penetrate to and contact the food below the surface strata of the mass with the result that the food at the surface is dried much more rapidly than the remainder of the food and, in many cases, the sub-surface food is not dried or dehydrated to the degree desired.

On the other hand, the comparatively few food dehydrators heretofore attempted of the type wherein the drying medium is passed entirely through a body or mass of the food being treated have been of the horizontally moving conveyor or screen type in which the food to be dehydrated is deposited onto the moving conveyor or screen and as it travels along, a suitable drying medium, usually warm air, is passed upwardly and/or downwardly through the conveyor and through the mass of food carried thereby.

Several difficulties and objections are presented by such dehydrators. In the first place, as travel of the conveyor and its load of food progress and the food becomes increasingly dry, both the volume and weight of the food decreases with the result that the depth of the food on the conveyor decreases proportionately. Thus, not only is the effective length of flow of the drying medium through the food correspondingly decreased, but also the resistance offered by the food to the passage of the medium is proportionately reduced with the result that the drying medium passes through the food at an increased rate of travel assuming, of course, that the drying medium is furnished at the same static pressure. This increased rate of flow produces a proportionate decrease in the temperature drop between the entering and leaving drying medium with a consequent decrease in the amount of moisture absorbed per pound of the medium passing through the food.

Secondly, the gradually increasing rate of flow resulting from the decreasing resistance to flow as drying of the food progresses, produces a tendency for the drying medium to follow the path of least resistance and create an unbalance in the amount of flow as between the initially more moist and drier portions of the food along the length of the conveyor so that, in the absence of adequate control of the drying medium, the greater volume thereof will pass through the drier, less dense zones of the food to the exclusion of the more moist and more dense portions thereof at the beginning of the run.

Thirdly, high first cost of initial equipment.

With the foregoing in mind, the principal object of the present invention is to provide a novel drier or dehydrator for foodstuffs of the so-called blow-through type wherein the resistance to passage of the drying medium offered by the food may be maintained substantially constant or uniform as the food becomes progressively drier.

Another object of the invention is to provide a dehydrator of the character set forth wherein uniformity of the resistance of the food to the passage of the drying medium is effected by increasing the length or path of travel through the food as drying thereof progresses with a consequent decrease in the rate of moisture diffusion.

Another object of the invention is to provide a food dehydrator as described wherein length or path of travel of the drying medium through the food may be increased uniformly and gradually, and at the desired rate, as drying progresses as distinguished from abrupt changes of the length of air travel between successive stages or steps.

Another object of the invention is to provide a food dehydrator or drier of the character set forth wherein the length of the path of air travel may be increased in proportion to the stage of the drying cycle at which the food product may be at any particular time.

Still another object of the invention is to provide a dehydrator of the type described wherein the length of the path of travel of the drying medium through the food, and consequently the resistance to air passage therethrough, may be controlled and regulated at will as dictated by a given drying procedure and/or the kind or type of food undergoing dehydration.

A still further object is to provide a dehydrator of the type described wherein the food moves relative to the screen, tray or the like, thereby eliminating the possibility of "tray burn."

A further object of the invention is to provide a food dehydrator of the stated character wherein a maximum drop in temperature is afforded between the entering and leaving drying medium in each stage or section of the dehydrator thereby providing a dehydrator which is characterized by maximum efficiency and economy in operation and use.

A further object of the invention is to provide a food dehydrator of the character set forth wherein the food being dried is fed and flows entirely by gravity thereby eliminating, to as great an extent as possible, the necessity for expensive and space-consuming mechanically movable food transporting devices such as conveyors, screws, trays and the like.

A still further object of the invention is to provide a food dehydrator unit of the described character which is of comparatively inexpensive, relatively simple construction, readily adaptable for use in multiple arrangements either in series or parallel, and in such arrangements one or more of the component units may be operated from common pressure and/or exhaust chambers as desired.

Still a further object of the present invention is to provide a dehydrator or drier of the stated character which embodies features of construction and arrangement permitting of its ready adaptation and use in conjunction with pre-drying equipment of existing or other types, and which may be incorporated or inserted at any predetermined location in the drying cycle of existing dehydration equipment and installations.

These and other objects of the invention and the various features and details of the construction and arrangement thereof are hereinafter fully set forth and described, and shown in the accompanying drawings, in which:

Figure 1 is a sectional view vertically through a dehydrator made according to the present invention.

Figure 2 is a view in section taken on line 2—2, Figure 1.

Figure 3 is an enlarged fragmentary view of the disclosure in Figure 1 illustrating certain structural features and details of the dehydrator.

Figure 4 is a sectional view vertically through a multiple or series form of dehydrator made according to the present invention.

Figure 5 is a sectional view vertically through another form or arrangement of multiple-series dehydrator embodying the invention.

Figure 6 is a view in perspective of the dehydrator shown in Figure 5 illustrating one arrangement of the various input and take-off ducts for the drying air; and Figure 7 is a diagrammatic sectional plan view illustrating a modified air duct and chamber arrangement affording complete flexibility and control of the direction of flow of the drying air.

Referring now to the drawings, and more particularly to Figure 1 thereof, a dehydrator embodying the present invention comprises essentially a pair of screen or perforated plate members 1 and 2, respectively, arranged in generally upstanding spaced apart relation and disposed in more closely spaced relation at the top than at the bottom thereof to provide a generally vertically extending path of travel for the food to be dehydrated which gradually increases in width downwardly.

Opening to and in register with the upper end or inlet to the space between the screens or plates 1 and 2 is a suitable hopper 3 for receiving the food to be dehydrated and feeding it uniformly and by gravity downwardly between said screens or plates, and depending angularly from the bottom or outlet end of the path of food travel defined by the said screens or plates 1 and 2 a suitable discharge chute or the like 4 may be provided.

In accordance with the invention, at opposite sides of the screens or plates 1 and 2, and outwardly thereof, there is provided, respectively, an input chamber (higher pressure) and an exhaust chamber (lower pressure) for the drying medium. In the embodiment of the invention illustrated in Figure 1, the input chamber is designated by the reference numeral 5 and is disposed at the outer side of the screen or plate 1 while the exhaust chamber is designated 6 and disposed at the outer side of the other screen or plate 2.

In the plane of the screens 1 and 2, these chambers 5 and 6 have an area and configuration substantially equal to the surface area of said screens and the latter form or constitute the inner walls of said chambers which, in addition, are provided with top and bottom walls 7, 8, 9 and 10, respectively, as well as outer side walls (not shown). The chambers 5 and 6 additionally are defined by end walls 11 and 12 which extend continuously across the drier or dehydrator and close or wall-off the end openings between the two screens or plates 1 and 2, as shown in Figure 2, thereby confining the food to a path of travel between said screens. Suitable ports or openings, of course, are provided in one wall of the chamber 5 for admitting the drying medium thereto and a suitable exhaust port or opening is provided in the chamber 6.

In operation, therefore, the drying medium, which usually is air at predetermined temperature and humidity, is admitted under a predetermined static pressure to the chamber 5 from which it passes through the screen or perforate plate 1, entirely through the column of food F travelling downwardly between the screens or plates 1 and 2, and then through the other screen or plate 2 into the chamber 6 from which it is exhausted either to the atmosphere and/or to be reheated and returned to the chamber 5 under pressure for recirculation or passaeg through the food F as aforesaid. In cases where the air is recirculated, the desired condition of absolute humidity may be obtained through the use of suitable dampers for regulating the amount of air recirculated and the amount of make-up air.

Now, as previously stated, a feature of the present invention contemplates a substantially uniform resistance to air flow through the column of food throughout the extent of the path of flow thereof through the dehydrator, and the accomplishment of this results by gradually increasing the length of the path of travel of the air through the food as drying thereof progresses in the course of passage of the food downwardly between the screens or plates 1 and 2 of the dehydrator, or, in other words, by gradually increasing the width or thickness of the column of food as it passes downwardly between said screens or plates.

In this connection, it is pointed out that the rate or gradient of this gradual increase in the width or thickness of the mass of food downwardly between the screens or plates that may be necessary to provide a resistance to air flow adjacent the discharge outlet which is commensurate or comparable to the air flow resistance at the inlet where the food, although the thickness or width of the food mass is narrower, is substantially more moist providing a greater resistance to air flow per unit of width or thickness than at the outlet where the food is substantially drier, of course, is dependent upon the kind and type of food to be dehydrated since different kinds and types of foodstuffs present different characteristics in respect to the rate that they will flow through the dehydrator and also in respect to their density and the rate of moisture absorption or drying thereof, factors which have a controlling effect upon the resistance to air flow for a given thickness or width of a mass of a given food.

Accordingly, provision is made in the dehydrator for adjusting the screens or plates 1 and 2 relative to each other at either or both the inlet and outlet ends of the dehydrator to vary the spacing between said screens or plates and/or the relative angular disposition thereof to regulate the gradient or rate at which the width or thickness of the food column increases as it progresses downwardly through the dehydrator.

This may be accomplished by any suitable construction and, as an illustrative example of one suitable arrangement, each of the screens or plates 1 and 2 may be provided at their upper and lower edges with laterally outward extending flanges or portions 13, 14, 15, 16, respectively, arranged so that the upper edge flanges 13 and 15 thereof underlie the top wall portions 7 and 9 of the adjacent air chambers 5 and 6 and their lower edge flanges 14 and 16 overlie the bottom wall portions 8 and 10 of said chambers.

As exemplified more particularly in Figure 3 of the drawings, each of the flanges may be releasably secured to the adjacent chamber wall portion by means of a suitable wing nut and bolt or the like 17 which extend through suitable slots 18 provided in said flanges to permit the screens or plates 1 and 2 selectively to be moved relative to each other and the top and bottom walls of the chambers upon loosening of the appropriate wing nuts and bolts 17.

In the dehydrator shown in Figure 1 of the drawings wherein single air chambers are provided at opposite outer sides of the screens or plates 1 and 2, operation of the dehydrator is usually limited to the passage through the dehydrator of air in one direction only and at a uniform predetermined temperature and static pressure, although the direction of air may be changed as desired and, of course, the temperature, pressure and humidity of the drying air required for any given product is controlled by regulation of the heaters and the make-up air through the usual dampers, fan, etc. On the other hand, in some adaptations of the dehydrator of the present invention, it may be desirable to provide a dehydrator arrangement affording passage of the drying air either in alternately opposite directions or at different temperatures, humidity and static pressures. Still other dehydrator arrangements may require a path of food travel of such length that it is impractical to employ but a single pair of screens 1 and 2 and associated air flow chambers 5 and 6 as in the arrangement of Figure 1.

In such cases, the dehydrator may comprise a plurality of dehydrator sections or units, each embodying the construction of Figure 1, arranged in a substantially vertical succession or series, for example, as shown in Figure 4 of the drawings. In this arrangement, comprising four vertically superimposed dehydrator sections or units of the type and construction previously described, it will be noted that the direction of flow of the drying medium through the column of food F, between each of the respective pairs of chambers 5 and 6, 5a and 6a, 5b and 6b, and 5c and 6c, is in alternately opposite directions and entirely separate and independent of the other pairs of chambers thereby making it possible to employ drying air at different temperatures, humidity and/or pressure conditions in each stage or section of the dehydrator. Of course, this arrangement of Figure 4 is not limited to alternately reversed air flow or to different temperatures, humidity or pressure conditions in the several stages and it should be understood that in all of the stages the direction of air flow may be the same as well as may be temperature, humidity and pressure conditions of the drying air.

An important factor in multiple unit or cell arrangements, such as that of Figure 4, which must be taken into consideration, particularly in installations employing alternately opposite directions of air flow, is the tendency existing in the region of the junctions between adjacent units or sections for the input air to follow the path of least resistance and bypass around the horizontal chamber division wall into the exhaust chamber immediately above or below instead of passing horizontally through the food column to the oppositely disposed or corresponding exhaust chamber.

To minimize this, suitable imperforate spacer members or blocks 19 are disposed between the screens or plates of adjacent dehydrator units or sections, and these spacers or blocks 19 have a height or dimension vertically of the dehydrator which is slightly in excess of the distance or spacing between the adjacent pairs of screens or plates of each section so that air entering, for example, chamber 5, will tend to pass through the food F to the oppositely disposed corresponding chamber 6 rather than bypass about the end of the partition 8 into the subjacent exhaust chamber 5a.

As in the case of the drier of Figure 1, in the multiple section arrangement shown in Figure 4, the several pairs of screens or plates 1, 2 and so on, are mounted for adjustment relative to each other in the manner previously described to vary, as between each pair of screens, the spacing thereof and/or their relative angular disposition to regulate and control the gradient or rate at which the width or thickness of the food column F increases as it progresses downwardly through the successive sections or units of the dehydrator.

In this connection, it is pointed out that the rate or angle of flare of the screens in the several successive stages or sections of the dehydrator may or may not be the same or uniform, and while in Figure 4 the screens are disposed to provide a uniform flare or rate of increase in the spacing therebetween throughout the height of the dehydrator, it should be borne in mind that the rate of increase of the spacing between the screens may be different, and vary, in the several sections or stages depending upon the drying and flow properties of the particular food through the successive sections or stages of the dehydrator.

In dehydrators or driers comprising a series or succession of dehydrator sections or units, for example, as in the arrangement shown in Figure 4, it may be necessary or desirable to provide for access to the food at one or more points in the course of passage thereof through the dehydrator for the purpose of inspecting, loosening or otherwise handling the food, and dehydrators comprising such a series of sections or units, as aforesaid, may be readily and easily arranged to provide access to the food passing therethrough between adjacent or successive dehydrator or drier sections.

One such arrangement is shown in Figure 5 of the drawings wherein the topmost section or unit of the dehydrator is disposed in laterally offset relation to the underlying sections or units. By this construction, it will be observed that the food to be dried may be fed by a conveyor to the hopper 3 from which it feeds downwardly between the screens or plates 1 and 2 of the top section of the dehydrator and as the food emerges from said top section it flows laterally and downwardly through an opening or break A provided between the top section and the next succeeding dehydrator section and then is discharged into the inlet opening of the second dehydrator section through which it flows, ultimately reaching the final section from which it is discharged in the dehydrated or dried condition desired. The break or opening A provided between the first and second drier sections as described, affords a point of access to the food for the inspection, sampling, or in handling thereof, or for removal after partial dehydration for subsequent processing.

As in the case of the dehydrator shown in Figure 4, the modified construction shown in Figure 5 may be arranged so that the direction of flow of the drying air through the food F between each of the respective pairs of chambers 5 and 6, 5a and 6a, and 5b and 6b, is in alternately opposite directions and entirely separate and independent of the other pairs of chambers thereby making it possible to employ drying air at different temperature, humidity and pressure conditions in each stage or section of the dehydrator, although it is to be understood that in all of the sections the direction of air flow and the temperature, humidity and pressure conditions of the air may be the same.

Figure 6 of the drawings shows the dehydrator of Figure 5 in perspective and in association with one suitable arrangement of ducts, blowers and heaters for conditioning and circulating the drying air through the food passing through the several sections or units of the dehydrator or drier. Referring to said Figure 6, a duct 21 leads from the air exhaust chamber 6 of the top section of the dehydrator through a suitable air heating device 22 to the suction side or intake of a blower 23, from which the heated air is discharged under predetermined static pressure through a duct 24 to the input chamber 5 of said section and thence through the food F to said chamber 6 from which it is exhausted by the suction of the blower 23, reheated and then recirculated from the same or any other one or more stages.

Similarly in the succeeding dehydrator sections, the air is exhausted from the chambers 6a and 5b through ducts 25 and 26 by the fan 27, heated by the heating device 28 and then discharged under pressure by said fan 27, through ducts 29 and 30 to the input chambers 5a and 6b, respectively, and through the food F to the corresponding exhaust chambers 6a and 5b, and so forth.

In lieu of the particular air flow arrangement of Figures 5 and 6, it will be obvious that the partition or wall which separates the two chambers 5a and 5b may be removed and the duct work arranged so that drying air entering chamber 5b from chamber 6b may enter the chamber 5a and from this pass in a reverse direction through the column of food F to the chamber 6a. Of course, in such arrangement the air input to the chamber 5a merely would be disconnected and, in some cases, it will be found advantageous to provide a suitable heating device between the chambers 5a and 5b to reheat the drying air from chamber 5b as it passes to the chamber 5a.

In certain dehydrator installations, and in particular those wherein the rate of travel of the food downwardly between the screens is relatively rapid, it may be desirable to provide for control of the direction of air flow as desired in each dehydrator section or unit. This may be accomplished, for example, by a construction such as shown in Figure 7 of the drawings, wherein air ducts 31 and 32, each of which is common to both of the air chambers 5 and 6 at opposite sides of the screens 1 and 2, are arranged at opposite ends of the dehydrator and provided with suitably arranged hinged baffle members 33 and 34, respectively, which may be positioned alternatively, as shown, to connect the ducts 31 and 32 to one or the other of the air chambers 5 and 6, thereby controlling the direction of air passage through the screens 1 and 2 and the material therebetween. Too, if desired, the baffle members 33 and 34 may be mechanically actuated at intervals to produce a periodic reversal of the direction of air flow as between corresponding pairs of air chambers.

The present invention provides a novel dehydrator of the so-called blow-through type wherein the resistance to passage of the air to provide a maximum temperature drop is effected by increasing the length of the path of air travel through the material as drying thereof progresses with an accompanying decrease in the rate of moisture diffusion. Too, the invention provides for control and regulation of the length of this path of air travel in accordance with the requirements of a particular drying operation and the kind and type of material being dried, and by virtue of the selective adjustability of the screen members of each unit independently of other units it is possible to obtain a drying operation of any desired character in each stage or unit of the dehydrator.

Economically, the invention substantially eliminates the necessity for expensive and space consuming mechanically movable transporting devices such as conveyors and the like, and is of comparatively inexpensive, relatively simple construction, readily adaptable for use in multiple arrangements in parallel, or comprising a succession or series arrangement and/or in laterally arranged banks or groups.

While certain embodiments of the invention have been herein illustrated and described, it is not intended that the invention be limited to such disclosure but that changes and modifications may be made and incorporated therein within the scope of the claims.

I claim:

1. A dehydrator comprising an opposed pair of upright screen members spaced apart in fixed downwardly diverging relation with inner faces thereof defining therebetween a path for gravitational descent and gradual lateral spreading of a bulk of loose separated material undergoing dehydration, vertical end walls cooperating with the upright marginal edges of said screens in defining said path cross sectionally, a chamber extending along the full length and breadth of each screen adjacent the outer face thereof, means for building up gaseous fluid in the chamber at one side of said path to a pressure forcing said gaseous fluid transversely through said bulk of material to the chamber at the opposite side of said path, the gradual increasing of the thickness of the bulk of material between said screens offering correspondingly increased resistance to the flow of fluid through the drier material in the lower part of said path in substantially equal ratio to the resistance offered by the wetter material in the upper part of said path to produce uniformity of said transverse flow of said gaseous fluid at all points throughout the length of said path, fluid pressure end passages connecting said chambers around said end walls respectively, a fluid pressure inlet and outlet conduit respectively connected to said end passages, and switch gates in said end passages for directing the flow of gaseous fluid into and out of said chambers selectively.

2. A dehydrator comprising a plurality of superposed separate dehydrator units each including an opposed pair of upright screen members spaced apart in fixed downwardly diverging relation with inner faces thereof defining therebetween a path for gravitational descent and gradual lateral spreading of a bulk of loose separated material undergoing dehydration, end walls cooperating with the side edges of said screens to form said path, a chamber extending along the full length and breadth of each screen adjacent the outer face thereof, means for building up gaseous fluid in the chamber at one side of said path to a pressure forcing said gaseous fluid transversely through said bulk of material to the chamber at the opposite side of said path, the gradual increasing of the thickness of the bulk of material between said screens offering correspondingly increased resistance to the flow of fluid through the drier material in the lower part of said path in substantially equal ratio to the resistance offered by the wetter material in the upper part of said path to produce uniformity of said transverse flow of said gaseous fluid at all points throughout the length of said path, fluid end passages connecting said chambers around said end walls respectively, fluid inlet and outlet conduits connected to said end passages respectively, and fluid switch gates in said end passages for directing fluid into and out of said chambers selectively, and an imperforate enclosure connecting the lower end of the path of the upper unit of a superposed pair with the upper end of the lower unit of the pair, each connecting enclosure having a vertical length in excess of the horizontal width of the path discharging into said enclosure to present a barrier between said units against the passage of said fluid vertically through said connecting enclosure from the path of one unit to the path of the next adjacent unit.

HIRAM W. WOODWARD.